United States Patent Office 3,355,474
Patented Nov. 28, 1967

3,355,474
PROCESS FOR PRODUCTION OF HYDROXY-ENDBLOCKED SILOXANE FLUIDS
Marshall L. Wheeler, Jr., Tonawanda, N.Y., assignor to Union Carbide Corporation, a corporation of New York
No Drawing. Filed July 1, 1963, Ser. No. 292,068
11 Claims. (Cl. 260—448.8)

This invention relates to an improved process for the preparation of hydroxy-endblocked organopolysiloxanes. More particularly, it relates to the process of contacting organopolysiloxanes containing halogen atoms and/or acyloxy groups with water-containing basic anion exchange material to form a hydroxy-endblocked organopolysiloxane product.

Hydroxy-endblocked organopolysiloxanes, such as the hydroxy-endblocked linear diorganopolysiloxanes, are well-known materials in the organosilicon art. Such materials have been prepared, for example, by controlled hydrolysis of diorganodihalosilanes, by neutralization of metal ester-endblocked linear diorganosiloxanes, by reaction of diorganopolysiloxanes with water and an organic nitrile in the presence of a basic catalyst, by reaction of diorganopolysiloxanes with aqueous solutions of monobasic acids and by reaction of completely condensed dimethylpolysiloxanes with steam at elevated pressure. Most of these prior art processes have the disadvantage that a mixture of products is prepared necessitating complex methods of separation to obtain specific desired products. Further, these processes do not enable one to obtain products of closely controlled molecular weight and viscosity.

It is therefore a principal object of the present invention to provide a process of preparing stable, well-defined hydroxy-endblocked organopolysiloxanes.

It is another object of the present invention to provide a process of preparing stable, well-defined hydroxy-endblocked linear diorganopolysiloxanes.

According to the present invention, an organopolysiloxane containing at least one silicon-bonded group selected from the class consisting of halogen atoms and acyloxy groups is contacted with a water-containing basic anion exchange material to form a hydroxy-endblocked organopolysiloxane product which can be recovered from the reaction mixture. The organopolysiloxanes useful as reactants in this novel process are represented by monofunctional organopolysiloxanes, difunctional organopolysiloxanes, trifunctional organopolysiloxanes, linear diorganopolysiloxanes, branched chain organopolysiloxanes and the like and mixtures thereof wherein the siloxane reactant contains at least one silicon-bonded group selected from the class consisting of halogen atoms and acyloxy groups. These starting siloxane materials are well-known in the organosilicon art and are prepared by well-known techniques.

The preferred siloxane materials useful as reactants in this novel process are the linear diorganopolysiloxane compounds represented by compounds having the formula:

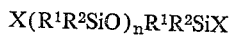

wherein $(n)$ is a positive number, $R^1$ and $R^2$ are hydrocarbyl radicals and X is selected from the class consisting of halogen atoms and acyloxy groups. Preferably $(n)$ has a value of about 130 to about 5600. Such preferred composition results in a hydroxy-endblocked dimethylpolysiloxane having a molecular weight of about 10,000 to about 400,000. While this is a preferred molecular weight range, it is understood that siloxanes having molecular weights above and below these preferred limits can also be prepared according to the process of the present invention. The hydrocarbyl radicals which are represented by $R^1$ and $R^2$ in the above formula are illustrated by alkyl groups, such as methyl, ethyl, propyl, isopropyl, butyl, isobutyl, amyl, hexyl and the like; alkenyl groups, such as vinyl, allyl, and the like; alicyclic groups, such as cyclopentyl, cyclohexyl and the like; aryl groups such as phenyl, naphthyl and the like; alkaryl groups, such as tolyl, ethylphenyl, xylyl, mesityl and the like; and aralkyl groups, such as benzyl, phenylethyl and the like. The $R^1$ and $R^2$ groups could all be the same or different. Preferably all the $R^1$ and $R^2$ groups are methyl radicals. The halogen atoms which are represented by X in the above formula are chlorine, bromine, iodine and fluorine. The acyloxy groups which are represented by X in the above formula are groups such as acetoxy, propanoyloxy, butanoyloxy, trimethylacetoxy, benzoyloxy and the like. It is preferred that X be chlorine. It is further preferred that the organopolysiloxane reactant be an equilibrated fluid.

The water-containing basic anion exchange materials, useful in this novel process are conveniently obtained in the form of finely-divided solid resin particles. These materials can be either strongly-basic or weakly basic. Mixtures of strongly basic and weakly basic types can also be used as well as anion exchange materials containing both strongly basic and weakly basic reactive sites. The anion exchange resins should be properly purified and placed in proper reactive form before use in the present process. The resins which are supplied in the free base form are allowed to stand in contact with distilled water at room temperature for several hours to remove any color or other leachable material. The resin is then washed several times with distilled water, filtered and used. If the anion exchange material is supplied in the salt or reacted form, it is converted to the free base form by washing with dilute solution of sodium hydroxide, for example, and then washed with distilled water until the effluent pH is about 7.0. The strongly basic materials are preferably converted to their carbonate form (strong base salt of a weak acid) by reaction with sodium bicarbonate, for example, prior to their use in the present process. The above described basic anion exchange materials as generally supplied contain about 30 to 60 weight percent water. While not intending to be limited thereby, the following is an explanation of the operation of the present novel process. The halogen and acyloxy groups of the siloxane react with the water contained in the anion exchange resin mass forming hydroxy-endblocked siloxanes and liberating hydrohalic and carboxylic acids. The liberated acid reacts immediately with the appropriate free base groups of the anion exchange resin. For example, when a chloro-endblocked siloxane is used, hydrogen chloride is formed during the reaction. This hydrogen chloride reacts with the anion exchange material to form the hydrochloride salt (if the resin contains an amine or quaternary base substitutent) or the chloride salt (if the resin contains the salt of a weak acid). Since the liberated acid becomes immediately tied-up in the resin, the overall siloxane-resin system remains essentially neutral. This minimizes any condensation of the hydroxyl end-blocking groups which might result if the liberated acid was allowed to go into solution and render the system acidic. Since the basic groups of the anion exchange resin are reactive with the acid liberated in the present process, the resin can be reconverted to the free base form by well-known techniques, such as washing with alkali, before being reused in the present process. The water-containing basic anion exchange material should be present in the reaction system in an amount necessary to provide sufficient water to hydrolyze all the halogen atoms and acyloxy groups of the siloxane and also to neutralize the resulting acids produced by such hydrolysis.

Preferably the basic anion exchange material is present in an amount of about 50 to 100 percent in excess of the stoichiometric amount. It has been found that for a hydroxy-endblocked organopolysiloxane product, such as dimethylpolysiloxane fluid, having a viscosity of about 100 to 30,000 centistokes, the water-containing basic anion exchange material should be present in an amount of about 3 to 35 parts by weight per 100 parts by weight of the starting siloxane material.

The basic anion exchange materials useful in the present invention are well-known and are available commercially from several sources. Typical basic anion exchange materials and their preparation are described, for example, in U.S. Patents 2,366,008; 2,591,573; 2,591,574; and 2,681,319. Such materials, for example, can consist of polymerized styrene-divinyl benzene containing reactive ion exchange sites. Other materials, such as phenol-formaldehyde resins, polystyrene and coal devivatives, can also be employed which contain the proper reactive sites. In the strongly basic anion exchange materials the reactive sites are generally quaternary ammonium groups, such as trimethylbenzylammonium groups. In the weakly basic anion exchange materials the reactive sites are generally primary and secondary polyamino groups, such as diethylenetriamino groups, and the like. The strongly basic anion exchange resins can be prepared by the following well-known general technique. Styrene and divinylbenzene are thoroughly mixed and an organic peroxide curing catalyst is dissolved in the mixture. This solution is poured into an equal or larger quantity of water and dispersed into droplets throughout the aqueous phase by agitation. The suspension then heated until polymerization begins. The droplets increase in viscosity, pass through sticky then rubbery stages and finally become hard spheres as the polymer grows. The polymerization is completed by continued heating in the reaction vessel or, after filtering the beads out of the water, in ovens. The styrene-divinylbenzene beads are now transferred to another vessel where they are reacted with chloromethyl ether, in the presence of aluminum chloride or zinc chloride catalyst, to introduce —$CH_2Cl$ groups on the benzene rings. This product is then aminated with trimethylamine, for example, to form a highly ionized quaternary ammonium group on the benzene rings. Weakly basic anion exchange resins can be prepared by copolymerization of styrene and divinylbenzene followed by chloromethylation and amination with diethylene triamine, for example. After washing with water the resin is neutralized with alkali to convert it to the free base form.

Strongly basic anion exchange materials useful in the present invention are sold under the following illustrative trade names:

| Reactive group: | Trade name |
| --- | --- |
| Quaternary | Amberlite IRA–400. |
| Quaternary | Amberlite IRA–401. |
| Quaternary | Amberlite IRA–401–S. |
| Quaternary | Amberlite IRA–402. |
| Quaternary | Amberlite IRA–405. |
| Quaternary | Amberlite IRA–410. |
| Quaternary | Amberlite IRA–425. |
| Quaternary | Dowex 1. |
| Quaternary | Dowex 2. |
| Quaternary | Dowex 21K. |
| Quaternary | Nalcite SAR. |
| Quaternary | Nalcite SBR. |
| Quaternary | Nalcite SBR–P. |
| Quaternary | Permutit S. |
| Quaternary | Permutit S–2. |
| Quaternary | Ionac A–540. |
| Quaternary | Ionac A–550. |
| Quaternary | Duolite A–101. |
| Quaternary | Duolite A–101D. |
| Quaternary | Duolite A–102. |

The weakly basic anion exchange resins useful in the present invention are sold under the following illustrative trade names:

| Reactive group: | Trade name |
| --- | --- |
| Polyamine | Amberlite IR–45. |
| Polyamine | Amberlite IR–4B. |
| Polyamine | Permutit A. |
| Polyamine | Permutit W. |
| Polyamine | De-Acidite. |
| Polyamine | Nalcite WBR. |
| Polyamine | Dowex 3. |
| Polyamine | Cellex-E. |
| Polyamine | Duolite-A–7. |
| Polyamine | Duolite-A–2. |
| Polyamine | Duolite-A–2M. |
| Polyamine | Duolite-A–4. |
| Polyamine | Duolite-A–6. |
| Polyamine | Rexyl RG6. |

Ion exchange materials which contain both strongly basic groups and weakly basic groups are sold, for example, under the following illustrative trade names:

| Reactive groups: | Trade name |
| --- | --- |
| Quaternary and polyamine | Duolite A–30B. |
| Quaternary and polyamine | Duolite A–41. |
| Quaternary and polyamine | Duolite A–43. |
| Quaternary and polyamine | Rexyn AG5. |

The process conditions for carrying out the present invention are not narrowly critical. At atmospheric pressure, the reaction temperature is from about 20° C. to about 100° C. Lower temperatures can be used if desired but without material benefit. As the reaction temperature exceeds about 100° C. the anion exchange resins begin to degrade. The reaction is preferably carried out at atmospheric pressure but pressures above and below atmospheric can be used if desired with no material advantages.

Although a solvent is not necessary for the above-described reaction to take place between the organopolysiloxane containing halogen atoms and/or acyloxy groups and the water in the anion exchange resin, the presence of an inert organic solvent is useful to lower the viscosity of the siloxane in order to facilitate agitation, filtering and other handling. Examples of useful solvents are toluene, benzene, xylene, n-hexane, n-heptane and the like. Such solvents are nonpolar and have boiling points between about 70 and 180° C. The amount of solvent is not critical and is governed by economics and the ability to handle siloxane fluids of variable viscosities.

The present invention is further described in the following examples wherein the siloxane starting material is first prepared by well-known prior art techniques, and the resulting chloro-endblocked dimethylpolysiloxane fluid is reacted with water-containing basic anion exchange material.

*Example 1*

A 2640 lb. quantity of mixed cyclic dimethylpolysiloxanes containing about 10 weight percent cyclic dimethylpolysiloxane trimer, about 85 weight percent cyclic dimethylpolysiloxane tetramer and about 5 weight percent higher cyclic polymers was charged to a 500 gallon glass lined kettle equipped with an agitator. The mixture was heated to 70° C. with agitation while gradually adding 700 grams of $FeCl_3 \cdot 6H_2O$ during the heating period. When the mixture temperature reached 70° C., 11.5 lbs. of dimethyldichlorosilane was added and the kettle sealed from the atmosphere. Agitation was continued until kettle mixture reached constant viscosity. The resulting chloro-endblocked dimethylpolysiloxane fluid had a viscosity at 25° C. of 6668 centistokes. The kettle was then opened to the atmosphere and the kettle contents were cooled to 60° C. and purged for ½ hour with dry nitrogen gas. A mixture of 85 lbs. of water-containing Amberlite IR–45 basic anion exchange resin and 120 gallons of toluene were charged to the kettle. The resin was a styrene-divinylbenzene copolymer having methylamino and dimethylamino reactive sites and containing 37–45 weight percent water. It had an anionic exchange capacity of 5.0 milliequivalents/gm. of resin and was in the form of beads having effective size of 0.35–0.50 mm. The kettle was again sealed and agitated for 4 hours. After the 4-hour agitation the kettle contents were filtered to remove the anion exchange resin and the toluene and low boiling siloxane materials were stripped from the filtrate by heating to 150° C. while sparging with 400 s.c.f.h. dry nitrogen gas. When the danger of flooding was past, the nitrogen sparging was increased to 1000 s.c.f.h. for two hours. The sparging stream was stopped and the kettle contents were subjected to reduced pressure of about 15 mm. Hg. Nitrogen sparging to the kettle was then adjusted to maintain a pressure of 50–75 mm. Hg. in the kettle for an additional two hours to stabilize the siloxane fluid product. The kettle contents were then cooled to room temperature and filtered. The resulting hydroxy-endblocked dimethylpolysiloxane fluid had a viscosity at 25° C. of 6967 centistokes.

*Example 2*

A 300 lb. quantity of mixed cyclic dimethylpolysioxanes containing about 10 weight percent cyclic dimethylpolysiloxane trimer, about 85 weight percent cyclic dimethylpolysiloxane tetramer and about 5 weight percent higher cyclic polymers was charged to a 50 gallon glass lined kettle equipped with an agitator. The mixture was heated to 70° C. with agitation while gradually adding 45 grams of $FeCl_3 \cdot 6H_2O$ during the heating period. When the mixture temperature reached 70° C., 2.43 lbs. of dimethyldichlorosilane was added and the kettle sealed from the atmosphere. Agitation was continued until kettle mixture reached constant viscosity. The resulting chloro-endblocked dimethylpolysiloxane fluid had a viscosity at 25° C. of 855 centistokes. The kettle was then opened to the atmosphere and the kettle contents were cooled to 60° C. and purged for ½ hour with dry nitrogen gas. A mixture of 9 lbs. of water-containing Amberlite IR–45 anion exchange resin (described in Example 1 above) and about five gallons of toluene were charged to the kettle. The resulting mixture was treated in the manner described in Example 1 above to produce a hydroxy-endblocked dimethylpolysiloxane fluid having a viscosity at 25° C. of 1375 centistokes.

The hydroxy-endblocked organopolysiloxanes produced by the process of the present invention are known to be useful in low temperature curable polysiloxane systems and as mold release agents, water-proofing agents, adhesives and antifoaming agents for aqueous systems.

While the above examples employed chloro-endblocked linear diorganopolysiloxanes as starting materials for reaction with the water-containing basic anion exchange materials, it should be understood that the invention is not so limited. Halo-and/or acyloxy end-blocked monofunctional organosiloxanes, non-linear difunctional organosiloxanes, trifunctional organosiloxanes, branched organosiloxanes and the like and mixtures thereof and mixtures with linear diorganosiloxanes can also be employed in the present invention as long as the siloxane contains at least one silicon-bonded halogen atom or acyloxy group per molecule of siloxane.

The above discussion was directed at a batch-type process, but it should be understood that the present invention is also useful for continuous processing such as wherein the starting siloxane is passed through a bed of water-containing basic anion exchange material or the siloxane and anion exchange material flow in counter-current relation. The process is continued until the anion-exchange material is exhausted. It is then regenerated with aqueous alkaline solution, for example, and can be reused.

What is claimed is:

1. A process for the production of hydroxy-endblocked organopolysiloxanes which consists essentially of contacting an organopolysiloxane containing at least one silicon-bonded group selected from the class consisting of halogen atoms and acyloxy groups with a finely divided solid particulate water-containing basic anion exchange material, and wherein the amount of anion exchange material present in the reaction system is at least sufficient to provide sufficient water to hydrolyze all of the halogen atoms and acyloxy groups of the siloxane and also to neutralize the resulting acids produced by such hydrolysis, and recovering a hydroxy-endblocked organopolysiloxane product from the reaction mixture.

2. A process for the production of hydroxy-endblocked organopolysiloxanes which consists essentially of contacting an organopolysiloxane containing at least one silicon-bonded group selected from the class consisting of halogen atoms and acyloxy groups with a finely divided solid particulate water-containing basic anion exchange material, and wherein the amount of anion exchange material present in the reaction system is at least sufficient to provide sufficient water to hydrolyze all of the halogen atoms and acyloxy groups of the siloxane and also to neutralize the resulting acids produced by such hydrolysis, and an inert organic solvent, and recovering a hydroxy-endblocked organopolysiloxane product from the reaction mixture.

3. A process for the production of hydroxy-endblocked organopolysiloxanes which consists essentially of contacting an organopolysiloxane containing at least one silicon-bonded halogen atom with a finely divided solid particulate water-containing basic anion exchange material, and wherein the amount of anion exchange material present in the reaction system is at least sufficient to provide sufficient water to hydrolyze all of the halogen atoms of the siloxane and also to neutralize the resulting acids produced by such hydrolysis, and recovering a hydroxy-endblocked organopolysiloxane product from the reaction mixture.

4. A process for the production of hydroxy-endblocked organopolysiloxanes which consists essentially of contacting an organopolysiloxane containing at least one silicon-bonded acyloxy group with a finely divided solid particulate water-containing basic anion exchange material, and wherein the amount of anion exchange material present in the reaction system is at least sufficient to provide sufficient water to hydrolyze all of the acyloxy groups of the siloxane and also to neutralize the resulting acids produced by such hydrolysis, and recovering a hydroxy-endblocked organopolysiloxane product from the reaction mixture.

5. A process for the production of hydroxy-endblocked linear diorganopolysiloxanes which consists essentially of contacting a halo-endblocked diorganopolysiloxane with a finely divided solid particulate water-containing basic anion exchange material, and wherein the amount of anion exchange material present in the reaction system is at least sufficient to provide sufficient water to hydrolyze all of the halogen atoms of the siloxane and also to neutralize the resulting acids produced by such hydrolysis, and recovering a finely divided solid particulate hydroxy-endblocked linear diorganopolysiloxane product from the reaction mixture.

6. A process for the production of hydroxy-endblocked linear diorganopolysiloxanes which consists essentially of contacting a chloro-endblocked diorganopolysiloxane with a finely divided solid particulate water-containing basic anion exchange material, and wherein the amount of anion exchange material present in the reaction system is at least sufficient to provide sufficient water to hydrolyze all of the chloro atoms of the siloxane and also to neutralize the resulting acids produced by such hydrolysis, and recovering a hydroxy-endblocked linear diorganopolysiloxane product from the reaction mixture.

7. A process for the production of hydroxy-endblocked linear diorganopolysiloxanes which consists essentially of contacting a chloro-endblocked diorganopolysiloxane with a finely divided solids particulate water-containing basic anion exchange material, and wherein the amount of anion exchange material present in the reaction system is at least sufficient to provide sufficient water to hydrolyze all of the chloro atoms of the siloxane and also to neutralize the resulting acids produced by such hydrolysis, and an inert organic solvent, and recovering a hydroxy-endblocked linear diorganopolysiloxane product from the reaction mixture.

8. A process for the production of hydroxy-endblocked linear dimethylpolysiloxanes which consists essentially of contacting a chloro-endblocked dimethylpolysiloxane with a finely divided solid particulate water-containing basic anion exchange material, and wherein the amount of anion exchange material present in the reaction system is at least sufficient to provide sufficient water to hydrolyze all of the chloro atoms of the siloxane and also to neutralize the resulting acids produced by such hydrolysis, and recovering a hydroxy-endblocked linear dimethylpolysiloxane product from the reaction mixture.

9. A process as defined in claim 8, wherein the water containing basic anion exchange material is present in an amount of about 3 to about 35 parts by weight per 100 parts by weight of the starting siloxane material.

10. A process for the production of hydroxy-endblocked linear dimethylpolysiloxanes which consists essentially of contacting a chloro-endblocked dimethylpolysiloxane with a finely divided solid particulate water-containing basic anion exchange material, and wherein the amount of anion exchange material present in the reaction system is at least sufficient to provide sufficient water to hydrolyze all of the chloro atoms of the siloxane and also to neutralize the resulting acids produced by such hydrolysis, and an inert organic solvent, and recovering a hydroxy-endblocked linear dimethylpolysiloxane product from the reaction mixture.

11. A process as defined in claim 10, wherein the water-containing basic anion exchange material is present in an amount of about 3 to 35 parts by weight per 100 parts by weight of the starting siloxane material.

References Cited
UNITED STATES PATENTS

| | | | |
|---|---|---|---|
| 2,796,406 | 6/1957 | Lorensen | 260—448.8 |
| 3,046,242 | 7/1962 | Santelli | 260—448.8 |
| 3,046,294 | 7/1962 | Pike | 260—448.8 |
| 3,078,293 | 2/1963 | Ender | 260—448.8 |
| 3,161,611 | 12/1964 | Rossmy | 260—448.8 |
| 3,223,474 | 12/1965 | Nitzsche et al. | 260—448.2 |

TOBIAS E. LEVOW, *Primary Examiner.*

P. F. SHAVER, *Assistant Examiner.*